Jan. 8, 1946.    R. O. RAY    2,392,409
WHEEL DOLLY
Filed Feb. 1, 1945
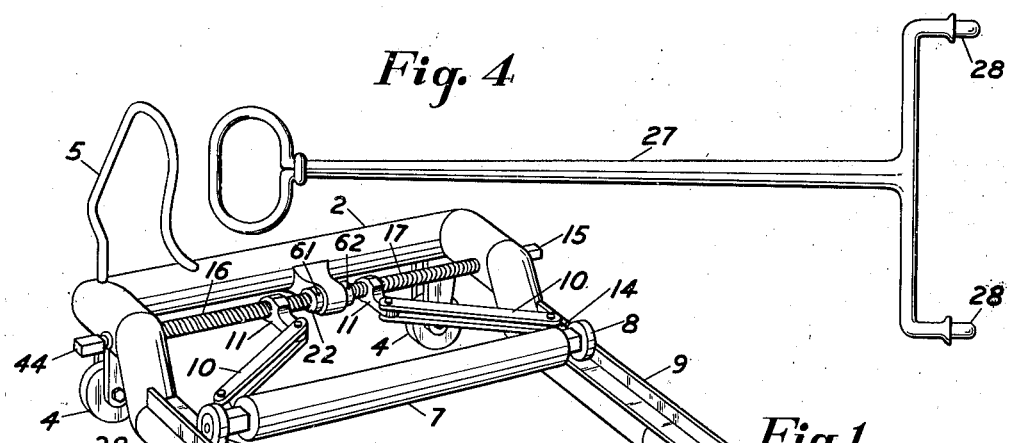
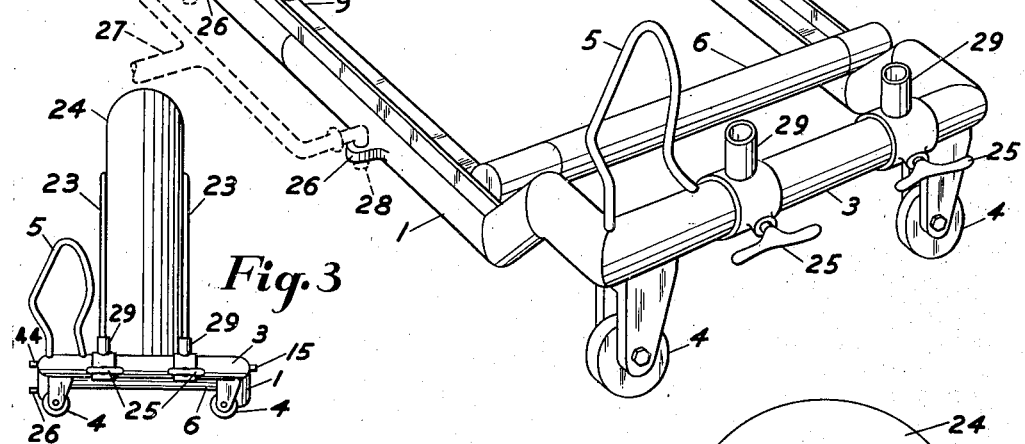
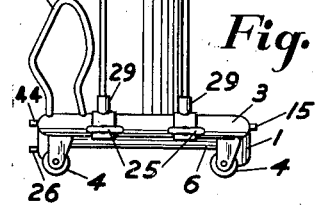
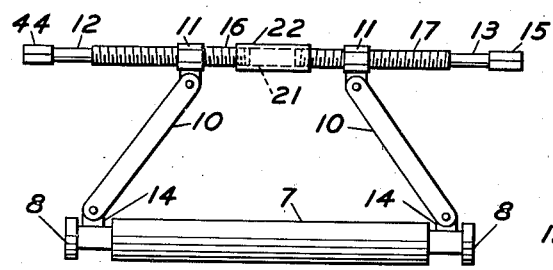
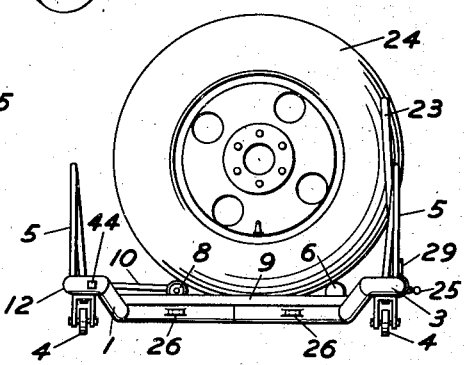
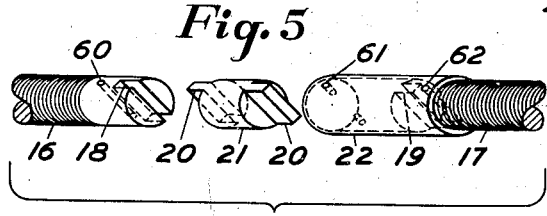
INVENTOR.
ROBERT O. RAY
BY
ATTORNEYS Patented Jan. 8, 1946

2,392,409

UNITED STATES PATENT OFFICE 2,392,409

WHEEL DOLLY

Robert O. Ray, Amarillo, Tex.

Application February 1, 1945, Serial No. 575,722

4 Claims. (Cl. 214—1)

(Granted under the act of March 3, 1883, as amended April 30, 1928; 370 O. G. 757)

The invention described herein may be manufactured and used by or for the Government for governmental purposes, without the payment to me of any royalty thereon.

My present invention relates generally to a dolly for removing heavy wheels from motor vehicles.

Much difficulty has been experienced in the removal of large wheels from trucks and the like. Much damage has resulted to grease seals, threads on the hub, et cetera. Moreover, in the case of many heavy vehicles, two or three men are required to remove the wheel.

It is accordingly, an object of my invention to overcome the above and other difficulties now experienced in removing heavy wheels from motor vehicles and it is more particularly an object of my invention to provide a wheel dolly which is simple in construction, economical in cost, easy to operate, and efficient in operation.

Another object of my invention is to provide a dolly which may be adjusted to accommodate different size wheels.

Another object of my invention is to provide a wheel dolly which supports the wheel in a vertical position.

Other objects of my invention will become evident from the following detailed description, taken in conjunction with the accompanying drawing, in which:

Figure 1 is a perspective view of my novel wheel dolly;

Figure 2 is a side elevational view with a motor vehicle wheel disposed on my novel dolly;

Figure 3 is an end elevational view of my novel dolly;

Figure 4 is a plan view of a towing bar for my novel dolly;

Figure 5 is a detail view showing the links and screw member forming a part of my novel dolly, and Figure 6 is a perspective view of the adjusting screw of my novel dolly.

Referring now to the drawing, Figures 1, 2 and 3 show a rectangular frame 1 having upwardly offset ends 2 and 3, casters 4, and handles 5. A wheel supporting member 6 is transversely disposed on one end of the frame 1. A movable, transversely disposed, supporting member 7 has wheels 8 for moving along run-ways 9 disposed on the upper side of the frame 1. Links 10 are connected to screwheads 11 threadably engaged to transversely disposed screw members 12 and 13 and to ears 14 integral with the transversely disposed supporting member 7. The screw members 12 and 13 have wrench engaging portions 44 and 15 on the outer ends thereof in order that they may be rotated from the sides of the frame 1. The screw member 12 has a right handed thread 16 and screw member 13 has a left handed thread 17. Screwheads 11 are therefore caused to move toward or away from the center in unison. Movement of the links 10 causes lateral movement of the support member 7. Movement of the screwheads 11 inwardly draws the support member 7 towards the screw members 12 and 13. Movement of the screwheads 11 outwardly on the screw members 12 and 13 moves the support member 7 away therefrom. The inner ends of the screw members 12 and 13 have slots 18 and 19 for engagement with connecting portions 20 of a connecting member 21. A sleeve 22 is disposed over the connecting member 21 when engaged.

The frame 1 has disposed on one end thereof, in this instance on the offset portion 3, transversely adjustable socket members 29 adapted to receive the supporting posts 23 for supporting a wheel 24 in vertical position as shown in Figures 2 and 3. The socket members 29 may be locked or unlocked by the locking screws 25 and set at any position along the offset portion 3. Laterally extending apertured lugs 26 are provided on frame 1 to receive a towing handle 27, the ends 28 of the towing handle 27 engaging the apertured portions of the lugs 26.

In operation, my novel wheel dolly is rolled under a vehicle wheel which has been jacked up from the ground, after which the nuts, seal, and bearing are removed. Screw members 12 and 13 are then rotated by a ratchet wrench or the like to move the supporting member 7 in the direction of the supporting member 6 until it engages the tire on the wheel. The supporting member 7 is moved inwardly far enough to take the weight of the wheel so that the wheel can be pulled easily from the axle bearing. Socket members 29 are usually adjusted before the dolly is placed under the wheel. Posts 23 are disposed in the sockets 29 thereby holding the wheel 24 in a vertical position. Towing bar 27 is ordinarily used for removing the dolly with the wheel thereon away from the vehicle although it is possible in many cases to use the handles 5.

It will be evident that I have provided a wheel dolly wherein one man may remove a large wheel from a motor vehicle. Another advantage in the use of my novel dolly is that it prevents damage to grease seals, hub threads, et cetera. It will further be evident that my novel wheel dolly may readily be used to remove dual wheels if this becomes necessary.

Various changes may be made in the specific embodiment of my present invention without departing from the spirit thereof, or from the scope of the appended claims.

What I claim is:

1. A wheel dolly comprising a frame, a transversely disposed supporting member for a wheel, a movable transversely disposed wheel-supporting member parallel to said first mentioned wheel-supporting member, a transversely disposed screw, screwheads movable on said screw member, and links connecting said movable supporting member and said movable heads to move said movable supporting member laterally relative to said fixed supporting member.

2. A wheel dolly comprising a frame, a transversely disposed supporting member for a wheel on said frame, a movable transversely disposed supporting member on said frame parallel to said first mentioned supporting member, a transversely disposed screw member having right and left hand threads, threaded heads for moving over said right and left hand threaded portions on said transversely disposed screw member, and links connecting said heads and said movable wheel-supporting member, said screwheads movable inwardly and outwardly from the center of said screw member to shift said movable supporting member laterally.

3. A wheel dolly comprising a frame, a transversely disposed substantially fixed supporting member for a wheel, a movable transversely disposed supporting member parallel to said fixed supporting member, angularly disposed links connected to said movable supporting member, and means for moving the ends of said links opposite said supporting member in opposite directions for moving said movable supporting member laterally relative to said fixed supporting member.

4. A wheel dolly comprising a frame, a transversely disposed substantially fixed supporting member for a wheel, a movable transversely disposed wheel-supporting member parallel to said first mentioned wheel-supporting member, rollers on the ends of said movable supporting member, parallel runways on said frame between said fixed and said movable supporting members for receiving said rollers, a transversely disposed screw, screw-heads movable on said screw member and links connecting said movable supporting member and said movable heads to move said movable supporting member laterally relative to said fixed supporting member.

ROBERT O. RAY.